(12) United States Patent
Shi et al.

(10) Patent No.: US 12,015,370 B2
(45) Date of Patent: Jun. 18, 2024

(54) SYSTEMS AND METHODS FOR CONTROLLING STEPPING MOTOR

(71) Applicant: ZHEJIANG DAHUA TECHNOLOGY CO., LTD., Zhejiang (CN)

(72) Inventors: Xiaoling Shi, Hangzhou (CN); Zengqi Yang, Hangzhou (CN); Jianping Li, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 15 days.

(21) Appl. No.: 17/662,849

(22) Filed: May 11, 2022

(65) Prior Publication Data
US 2022/0271693 A1 Aug. 25, 2022

Related U.S. Application Data

(63) Continuation of application No. PCT/CN2020/107841, filed on Aug. 7, 2020.

(30) Foreign Application Priority Data

Dec. 24, 2019 (CN) .......................... 201911349218.7

(51) Int. Cl.
H02P 29/64 (2016.01)
H02P 8/12 (2006.01)
H02P 8/14 (2006.01)
H02P 8/34 (2006.01)

(52) U.S. Cl.
CPC ................. H02P 8/12 (2013.01); H02P 8/34 (2013.01)

(58) Field of Classification Search
CPC ............. H02P 29/64; H02P 23/14; H02P 8/14
See application file for complete search history.

(56) References Cited

U.S. PATENT DOCUMENTS

| 5,262,708 A | 11/1993 | Metzger |
| 9,906,179 B1 | 2/2018 | Kimura |
| 2010/0289445 A1* | 11/2010 | Bagarelli ................. H02P 8/22 318/696 |
| 2013/0083434 A1 | 4/2013 | Barth |

(Continued)

FOREIGN PATENT DOCUMENTS

| CN | 101814888 A | 8/2010 |
| CN | 201742364 U | 2/2011 |

(Continued)

OTHER PUBLICATIONS

International Search Report in PCT/CN2020/107841 mailed on Nov. 10, 2020, 4 pages.

(Continued)

*Primary Examiner* — Kawing Chan
*Assistant Examiner* — Charles S Laughlin
(74) *Attorney, Agent, or Firm* — METIS IP LLC

(57) ABSTRACT

The present disclosure relates to systems and methods for controlling a stepping motor. A method may include determining a driving voltage based on a function, wherein the function includes a predetermined electric current and operating parameters of the stepping motor; and driving the stepping motor to work based on the driving voltage via an H-bridge.

18 Claims, 6 Drawing Sheets

(56) References Cited

U.S. PATENT DOCUMENTS

| 2016/0013743 | A1* | 1/2016 | Braat .................. H02P 8/22 |
| | | | 318/696 |
| 2016/0315571 | A1 | 10/2016 | Hashimoto et al. |
| 2017/0366123 | A1 | 12/2017 | Saw et al. |
| 2019/0081581 | A1 | 3/2019 | Kimura |

FOREIGN PATENT DOCUMENTS

| CN | 102324886 A | 1/2012 |
| CN | 105978430 A | 9/2016 |
| JP | 2009038855 A | 2/2009 |
| WO | 2021128862 A1 | 7/2021 |

OTHER PUBLICATIONS

Written Opinion in PCT/CN2020/107841 mailed on Nov. 10, 2020, 5 pages.
First Office Action in Chinese Application No. 201911349218.7 mailed on Jan. 5, 2021, 13 pages.
The Extended European Search Report in European Application No. 20906115.9 mailed on Nov. 15, 2022, 8 pages.

\* cited by examiner

SYSTEMS AND METHODS FOR CONTROLLING STEPPING MOTOR

CROSS-REFERENCE TO RELATED APPLICATIONS

This application is a Continuation of International Application No. PCT/CN2020/107841, filed on Aug. 7, 2020, which claims priority of Chinese Application No. 201911349218.7, filed on Dec. 24, 2019, the contents of which are incorporated herein by reference.

TECHNICAL FIELD

The present disclosure generally relates to systems and methods for controlling a stepping motor.

BACKGROUND

Stepping motors are widely used. Existing methods for driving a stepping motor use an integrated circuit driving chip with a built-in Pulse width modulation (PWM) chopper controller to drive the stepping motor to generate PWM choppers and acquire currents of windings of the stepping motor. A duty ratio of a PWM chopper generator may be controlled by feedback currents, thereby the currents of the windings of the stepping motor are within predetermined values. However, the output feedback currents are not constant values, resulting in nonperiodic ripples that exist in the currents of windings when the stepping motor is not working. Noises are produced. In addition, the stepping motor vibrates due to the distortion at zero crossing point. Thus, it is desirable to provide systems and methods for controlling stepping motors to solve the problems of noises and vibrations of the stepping motors.

SUMMARY

An aspect of the present disclosure introduces a system for controlling a stepping motor. The system may include at least one storage medium including a set of instructions for controlling a stepping motor, and at least one processor in communication with the storage medium. When executing the set of instructions, the at least one processor may perform the operations including determining a driving voltage based on a function, wherein the function includes a predetermined electric current and operating parameters of the stepping motor; and driving the stepping motor to work based on the driving voltage via an H-bridge.

In some embodiments, the function may include $|U|=\sqrt{(|I|\omega L+\omega|C|\sin\gamma)^2+(|I|R+\omega|C|\cos\gamma)^2}$, wherein $|U|$ denotes an amplitude of the driving voltage, $|I|$ denotes an amplitude of the predetermined electric current, the predetermined electric current is a sinusoidal current, $\omega$ denotes an angular frequency of the driving voltage, $|C|$ denotes a back electromotive force constant of the stepping motor, L denotes a phase inductance of the stepping motor, $\gamma$ denotes a load angle of the stepping motor, and R denotes a sum of a phase resistance of the stepping motor and an on-resistance of the H-bridge.

In some embodiments, the operations may further include: driving the stepping motor with a first working voltage; obtaining a first working current of the stepping motor under the first working voltage; and determining the back electromotive force constant based on the first working voltage and the first working current.

In some embodiments, the back electromotive force constant may be determined according to $$|C| = \frac{1}{\omega}\sqrt{(|U_1|\sin\phi - |I_1|\cdot\omega L)^2 + (|U_1|\cos\phi - |I_1|\cdot R)^2},$$

wherein $|C|$ denotes the back electromotive force constant of the stepping motor, $\omega$ denotes an angular frequency of the first working voltage, $|U_1|$ denotes an amplitude of the first working voltage, $\phi$ denotes a phase of the first working voltage, $|I_1|$ denotes an amplitude of the first working current, L denotes the phase inductance of the stepping motor, and R denotes the sum of the phase resistance of the stepping motor and the on-resistance of the H-bridge.

In some embodiments, the operations may further include: determining the phase resistance of the stepping motor based on an operating environment of the stepping motor.

In some embodiments, the phase resistance of the stepping motor may be determined according to $R_1=R_{25°\,C.}\times(1+(T-25)*0.004)$, wherein $R_1$ denotes the phase resistance of the stepping motor, $R_{25°\,C.}$ denotes a phase resistance of the stepping motor when the stepping motor is operated at 25° C., and T denotes a temperature of the operating environment.

In some embodiments, the operations may further include: driving the stepping motor with a second working voltage; obtaining a second working current of the stepping motor under the second working voltage; and determining the load angle of the stepping motor based on the second working voltage and the second working current.

In some embodiments, the load angle may be determined according to $$\gamma = \arctan\frac{|U_2|\sin\phi - |I_2|\cdot\omega L}{|U_2|\cos\phi - |I_2|\cdot R},$$

wherein $\gamma$ denotes the load angle, $|U_2|$ denotes an amplitude of the second working voltage, $\phi$ denotes a phase of the second working voltage, $|I_2|$ denotes an amplitude of the second working current, $\omega$ denotes an angular frequency of the second working voltage, L denotes the phase inductance of the stepping motor, and R denotes the sum of the phase resistance of the stepping motor and the on-resistance of the H-bridge.

In some embodiments, the operations may further include: storing a table indicating a relationship between the driving voltage and the angular frequency.

In some embodiments, the driving the stepping motor to work based on the driving voltage via the H-bridge may include: obtaining pulse width modulation (PMW) signals by inputting an amplitude of the driving voltage to a sinusoidal pulse width modulation (SPWM) generation module; and controlling the H-bridge to drive the stepping motor by inputting the PWM signals to the H-bridge.

According to another aspect of the present disclosure, a method for controlling a stepping motor is provided. The method may include determining a driving voltage based on a function, wherein the function includes a predetermined electric current and operating parameters of the stepping motor; and driving the stepping motor to work based on the driving voltage via an H-bridge.

According to still another aspect of the present disclosure, a non-transitory computer-readable medium, comprising at least one set of instructions for controlling a stepping motor is provided. When executed by at least one processor of an electrical device, the at least one set of instructions may direct the at least one processor to perform the following operations. The at least one processor may perform the operations including determining a driving voltage based on a function, wherein the function includes a predetermined electric current and operating parameters of the stepping motor; and driving the stepping motor to work based on the driving voltage via an H-bridge.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
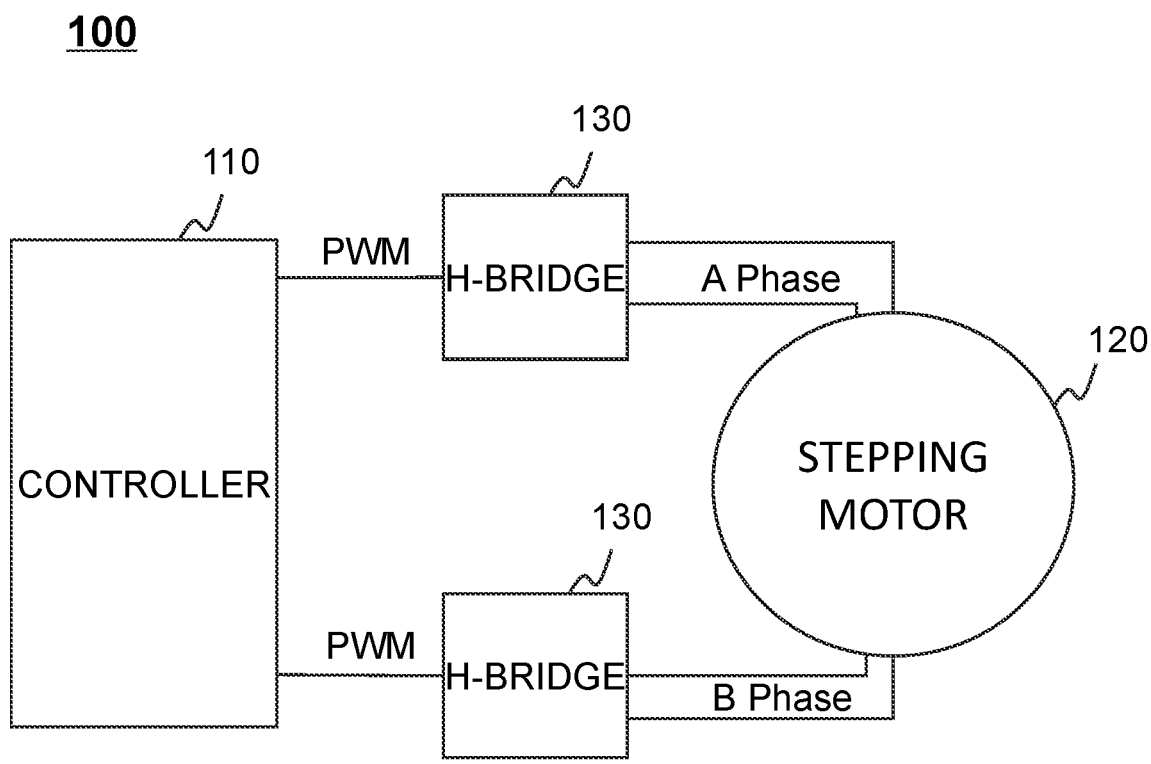
FIG. 1 is a schematic diagram illustrating an exemplary system for controlling a stepping motor according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Pulse width modulation (PWM) may be an analog control method, which modulates a base of a transistor or a bias of a grid of a semiconductor field effect transistor according to corresponding load changes. The conducting time of the transistor or the semiconductor field effect transistor may change, and thereby realize a change of an output of a switching stabilized power supply. Back electromotive force may be an electromotive force that is produced by resisting a changing tendency of a current.

An aspect of the present disclosure relates to systems and methods for controlling a stepping motor. To this end, the systems and methods may determine a voltage for driving the stepping motor using a predetermined electric current and operating parameters of the stepping motor according to a function. The predetermined electric current may be determined based on an application scenario of the stepping motor. In this way, the systems and methods may solve the problems of noises and vibrations of the stepping motors.

FIG. 1 is a schematic diagram of an exemplary system 100 for controlling a stepping motor according to some embodiments of the present disclosure. The system 100 may include a controller 110, a stepping motor 120, and an H-bridge 130.

The controller 110 may be configured to control the stepping motor 120. For example, the controller 110 may determine a driving voltage for the stepping motor 120. As another example, the controller 110 may drive the stepping motor 120 to work based on the driving voltage via an H-bridge 130. In some embodiments, the controller 110 may be a single server or a server group. The server group may be centralized, or distributed (e.g., the controller 110 may be a distributed system). In some embodiments, the controller 110 may be local or remote. In some embodiments, the controller 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the controller 110 may be implemented on a computing device 200 having one or more components illustrated in FIG. 2 in the present disclosure. In some embodiments, the controller 110 may be implemented on a microchip.

In some embodiments, the controller 110 may include one or more processing engines (e.g., single-core processing engine(s) or multi-core processor(s)). Merely byway of example, the controller 110 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

The stepping motor 120 may be an electric motor that divides a full rotation into a plurality of equal steps. In some embodiments, the stepping motor 120 may be used to control movements of a device, such as a holder, a light controlling device, a 3D printer, etc. In some embodiments, the controller 110 may output PWM signals to the H-bridge 130 to control the bridge 130 to output the driving voltage. The bridge 130 may output the driving voltage to the stepping motor 120. The stepping motor 120 may work under the driving voltage.

Figure 2:
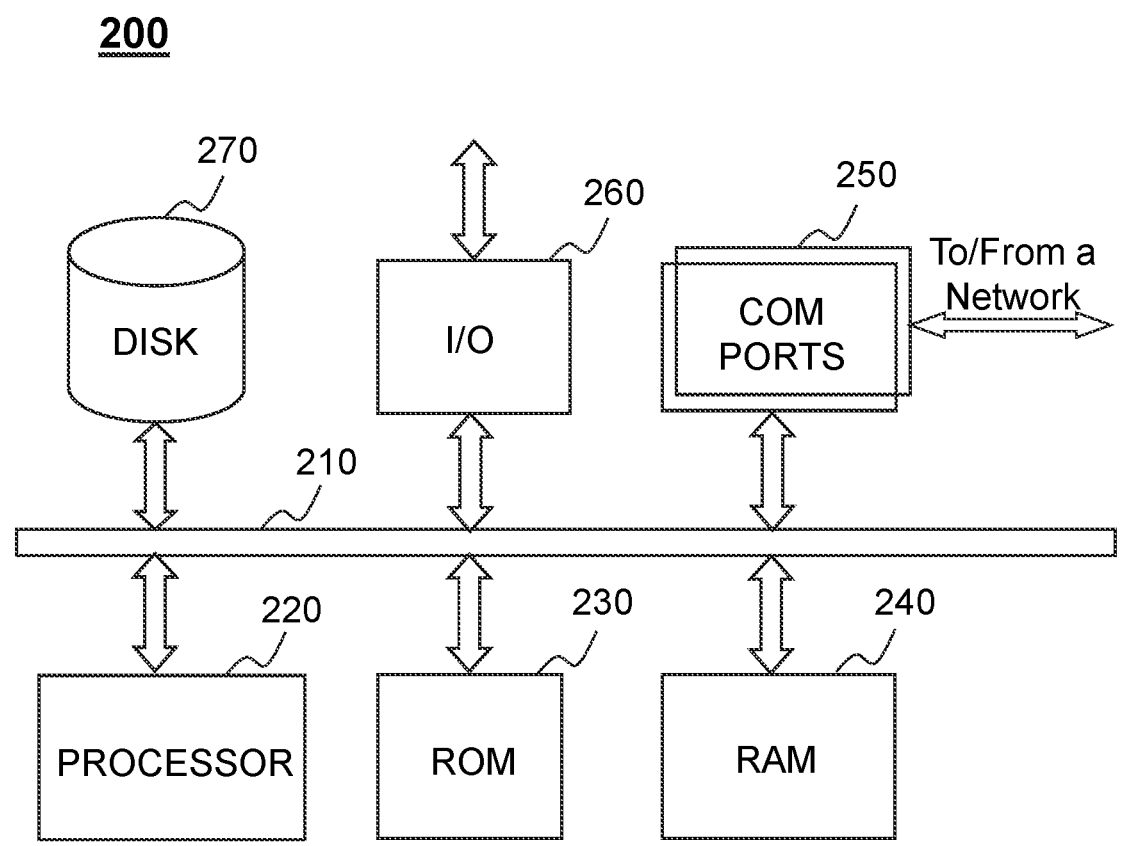
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the controller 110 may be implemented according to some embodiments of the present disclosure. The computing device 200 may be used to implement the controller 110 of the system 100 that performs one or more functions disclosed in the present disclosure. For example, the controller 110 may be implemented on the computing device 200, via its hardware, software program, firmware, or a combination thereof. Although only one such computer is shown, for convenience, the computer functions relating to the controller 110 as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other types of non-transitory storage medium to be executed by the processor 220. The methods and/or processes of the present disclosure may be implemented as the program instructions. The exemplary computing device may also include operating systems stored in the ROM 230, RAM 240, and/or other types of non-transitory storage medium to be executed by the processor 220. The program instructions may be compatible with the operating systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
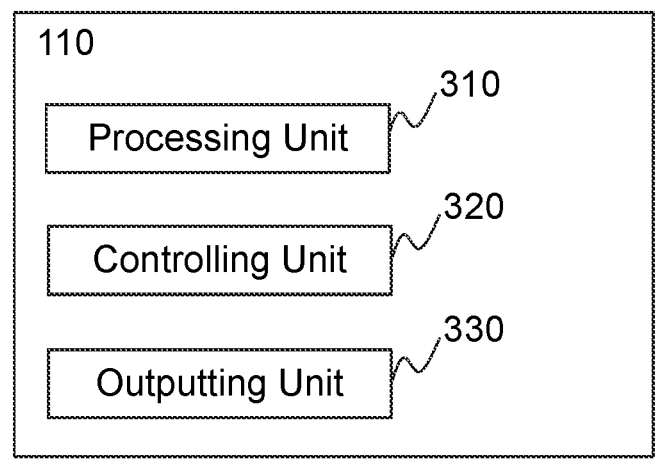
FIG. 3 is a block diagram illustrating an exemplary controller according to some embodiments of the present disclosure.

FIG. 3 is a block diagram illustrating an exemplary controller 110 according to some embodiments of the present disclosure. As shown in FIG. 3, the controller 110 may include a processing unit 310, a controlling unit 320, and an outputting unit 330.

The processing unit 310 may be configured to determine a driving voltage for driving the stepping motor 120. In some embodiments, the processing unit 310 may determine the driving voltage based on a function including a predetermined electric current and operating parameters of the stepping motor 120.

The controlling unit 320 may be configured to obtain PMW signals by inputting an amplitude of the driving voltage to a sinusoidal pulse width modulation (SPWM) generation module.

The outputting unit 330 may be configured to drive the stepping motor 120 to work based on the driving voltage via an H-bridge 130. In some embodiments, the outputting unit 330 may control the H-bridge 130 to drive the stepping motor 120 by inputting the PWM signals to the H-bridge 130.

Figure 4:
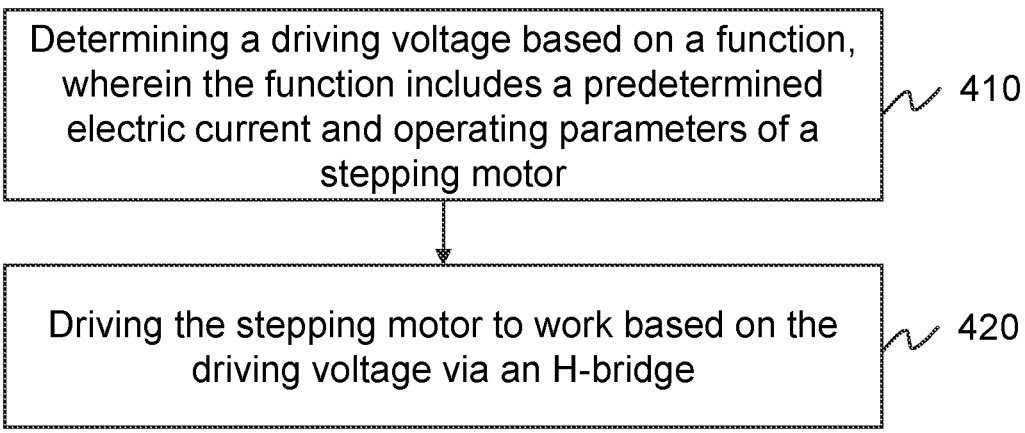
FIG. 4 is a flowchart illustrating an exemplary process for controlling a stepping motor according to some embodiments of the present disclosure.

FIG. 4 is a flowchart illustrating an exemplary process 400 for controlling a stepping motor according to some embodiments of the present disclosure. The process 400 may be executed by the system 100. For example, the process 400 may be implemented as a set of instructions (e.g., an application) stored in the storage ROM 230 or the RAM 240. The processor 220 may execute the set of instructions, and when executing the instructions, it may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process as illustrated in FIG. 4 and described below is not intended to be limiting.

In 410, the controller 110 (e.g., the processor 220, the processing unit 310) may determine a driving voltage based on a function. In some embodiments, the function may include a predetermined electric current and operating parameters of the stepping motor 120.

In some embodiments, the controller 110 may determine the predetermined electric current according to an application scenario (e.g., a working condition of the stepping motor 120, an operating environment of the stepping motor 120, etc.). For example, the stepping motor 120 may work at an electric current of A1, the controller 110 may determine the electric current A1 as the predetermined electric current. In some embodiments, the operating parameters of the stepping motor 120 may include a plurality of parameters associated with the stepping motor 120. For example, the operating parameters of the stepping motor 120 may include an angular frequency of the driving voltage, a back electromotive force constant of the stepping motor 120, a phase inductance of the stepping motor 120, a load angle of the stepping motor 120, a phase resistance of the stepping motor 120, or the like, or any combination thereof. In some embodiments, the operating parameters of the stepping motor 120 may include a calculated value of one or more parameters associated with the stepping motor 120. For example, the operating parameters of the stepping motor 120 may include a sum of a phase resistance of the stepping motor 120 and an on-resistance of the H-bridge 130.

In some embodiments, the function may be an Equation (1):

$$|U|=\sqrt{(|I|\omega L+\omega|C|\sin\gamma)^2+(|I|R+\omega|C|\cos\gamma)^2} \quad (1),$$

wherein |U| denotes an amplitude of the driving voltage, |I| denotes an amplitude of the predetermined electric current, ω denotes an angular frequency of the driving voltage, |C| denotes a back electromotive force constant of the stepping motor 120, L denotes a phase inductance of the stepping motor 120, γ denotes a load angle of the stepping motor 120, and R denotes a sum of a phase resistance of the stepping motor 120 and an on-resistance of the H-bridge 130. In some embodiments, the predetermined electric current may be a sinusoidal current.

In some embodiments, the angular frequency may reflect a rotating speed of the stepping motor 120. In some embodiments, the back electromotive force constant, the phase inductance, and the phase resistance may be parameters reflecting characteristics of the stepping motor 120. In some embodiments, the phase inductance and the phase resistance may be known parameters of the stepping motor 120. In some embodiments, the back electromotive force constant may be measured by experiments. In some embodiments, the load angle may be an empirical constant of the stepping motor 120. The load angle may be measured by experiments.

Figure 5:
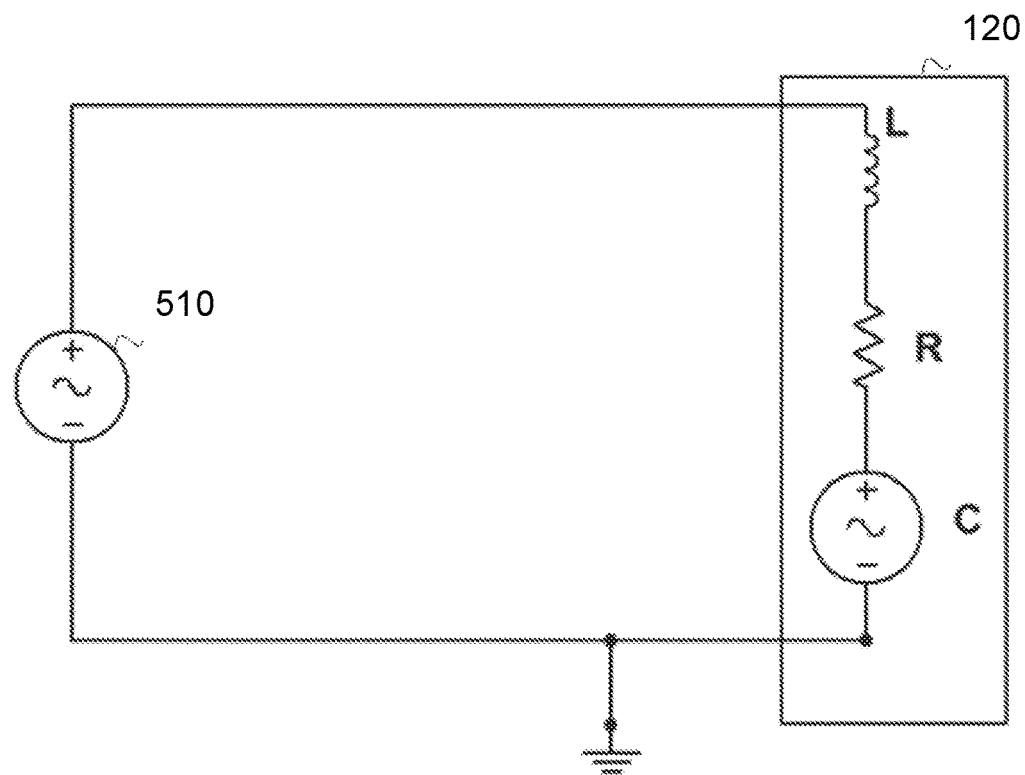
FIG. 5 is a schematic diagram illustrating an exemplary circuit model of a stepping motor according to some embodiments of the present disclosure.

In some embodiments, the controller 110 may determine the function according to a circuit model of the stepping motor 120. FIG. 5 is a schematic diagram illustrating an exemplary circuit model of a stepping motor 120 according to some embodiments of the present disclosure. As shown in FIG. 5, a power 510 may provide a driving voltage U for the stepping motor 120. In the stepping motor 120, a phase inductance of the stepping motor 120 may be L, a phase resistance of the stepping motor 120 may be R, and a back electromotive force constant of the stepping motor 120 may be C. According to the circuit model, the driving voltage U may be determined according to Equation (2):

$$U=I\cdot(R+j\omega L)+\omega C \quad (2),$$

wherein U, I, and C are vectors. In some embodiments, the phase inductance L and the phase resistance R may be presented as vector quantities by amplitude and phase according to Equations (3) and (4):

$$|Z| = \sqrt{R^2 + (\omega L)^2}, \quad (3)$$

$$\beta = \arctan\frac{\omega L}{R}. \quad (4)$$

In some embodiments, the Equation (2) may be represented using a geometric vector method when assigning I as a reference phase 0. Equation (2) may be transformed as Equation (5):

$$|U|e^{j\phi}=|I|e^{j0}\cdot|Z|e^{j\beta}+\omega|C|e^{j\gamma} \quad (5).$$

In some embodiments, the Equation (5) may be transformed as Equation (6):

$$|U|=\sqrt{(|I|\cdot|Z|\sin\beta+\omega|C|\sin\gamma)^2+(|I|\cdot|Z|\cos\beta+\omega|C|\cos\gamma)^2} \quad (6).$$

In some embodiments, Equation (1) may be obtained by inputting the Equations (3) and (4) into Equation (6).

In some embodiments, the driving voltage may be a sinusoidal voltage represented according to Equation (7) or Equation (8):

$$U=\sin \omega t\cdot\{\sqrt{(|I|\omega L+\omega|C|\sin\gamma)^2+(|I|R+\omega|C|\cos\gamma)^2}\} \quad (7),$$

$$U=\cos \omega t\cdot\{\sqrt{(|I|\omega L+\omega|C|\sin\gamma)^2+(|R|+\omega|C|\cos\gamma)^2}\} \quad (8).$$

In some embodiments, the controller 110 may further determine the back electromotive force constant. For example, the controller 110 may drive the stepping motor 120 using a first working voltage. The controller 110 may obtain a first working current of the stepping motor 120 under the first working voltage. The controller 110 may determine the back electromotive force constant based on the first working voltage and the first working current according to Equation (9):

$$|C| = \frac{1}{\omega}\sqrt{(|U_1|\sin\phi - |I_1|\cdot\omega L)^2 + (|U_1|\cos\phi - |I_1|\cdot R)^2}, \quad (9)$$

wherein |C| denotes the back electromotive force constant of the stepping motor 120, ω denotes an angular frequency of the first working voltage, $|U_1|$ denotes an amplitude of the first working voltage, φ denotes a phase of the first working voltage, $|I_1|$ denotes an amplitude of the first working current, L denotes the phase inductance of the stepping motor 120, and R denotes the sum of the phase resistance of the stepping motor 120 and the on-resistance of the H-bridge 130.

In some embodiments, the controller 110 may determine the back electromotive force constant and store the back electromotive force constant in a storage device of the system 100 (e.g., the ROM 230, the RAM 240, etc.). In some embodiments, the controller 110 may access the storage device to obtain the back electromotive force constant.

In some embodiments, the controller 110 may further determine the phase resistance of the stepping motor 120 based on an operating environment (e.g., a temperature of the operating environment) of the stepping motor 120. In some embodiments, the phase resistance of the stepping motor 120 may be varied in different operating temperatures. The phase resistance may increase as the operating temperature increases. For example, the controller 110 may determine the phase resistance according to Equation (10):

$$R_1 = R_{25°\ C.} \times (1+(T-25)*0.004) \quad (10),$$

wherein $R_1$ denotes the phase resistance (a corrected phase resistance) of the stepping motor 120, $R_{25°\ C.}$ denotes a phase resistance of the stepping motor 120 when the stepping motor 120 is operated at 25° C., and T denotes a temperature of the operating environment. In some embodiments, the controller 110 may obtain the phase resistance $R_{25°\ C.}$ of the stepping motor 120 when the stepping motor 120 is operated at 25° C. and the temperature T of the operating environment to determine the corrected phase resistance.

In some embodiments, the controller 110 may further determine the load angle of the stepping motor 120. For example, the controller 110 may driving the stepping motor 120 using a second working voltage. The controller 110 may obtain a second working current of the stepping motor 120 under the second working voltage. The controller 110 may determine the load angle of the stepping motor 120 based on the second working voltage and the second working current according to Equation (11).

$$\gamma = \arctan \frac{|U_2| \sin \phi - |I_2| \cdot \omega L}{|U_2| \cos \phi - |I_2| \cdot R}, \quad (11)$$

wherein $\gamma$ denotes the load angle, $|U_2|$ denotes an amplitude of the second working voltage, $\phi$ denotes a phase of the second working voltage, $|I_2|$ denotes an amplitude of the second working current, $\omega$ denotes an angular frequency of the second working voltage, L denotes the phase inductance of the stepping motor 120, and R denotes the sum of the phase resistance of the stepping motor 120 and the on-resistance of the H-bridge 130.

In some embodiments, the driving voltage may be not determined in real-time. For example, for each predetermined electric current, the controller 110 may determine a corresponding driving voltage. The controller 110 may store a table indicating a relationship between a driving voltage and a corresponding angular frequency after each determining process of the driving voltage. In some embodiments, the table may be stored in a storage device of the system 100 (e.g., the ROM 230, the RAM 240, etc.). The controller 110 may determine an angular frequency based on a current rotating speed of the stepping motor 120 and access the table stored in the storage device to obtain a driving voltage corresponding to the angular frequency.

In 420, the controller 110 (e.g., the processor 220, the outputting unit 330) may drive the stepping motor 120 to work based on the driving voltage via an H-bridge 130.

In some embodiments, the controller 110 (e.g., the processor 220, the controlling unit 320) may obtain PMW signals by inputting an amplitude of the driving voltage to a sinusoidal pulse width modulation (SPWM) generation module. The controller 110 may control the H-bridge 130 to drive the stepping motor 120 by inputting the PWM signals to the H-bridge 130.

Figure 6:
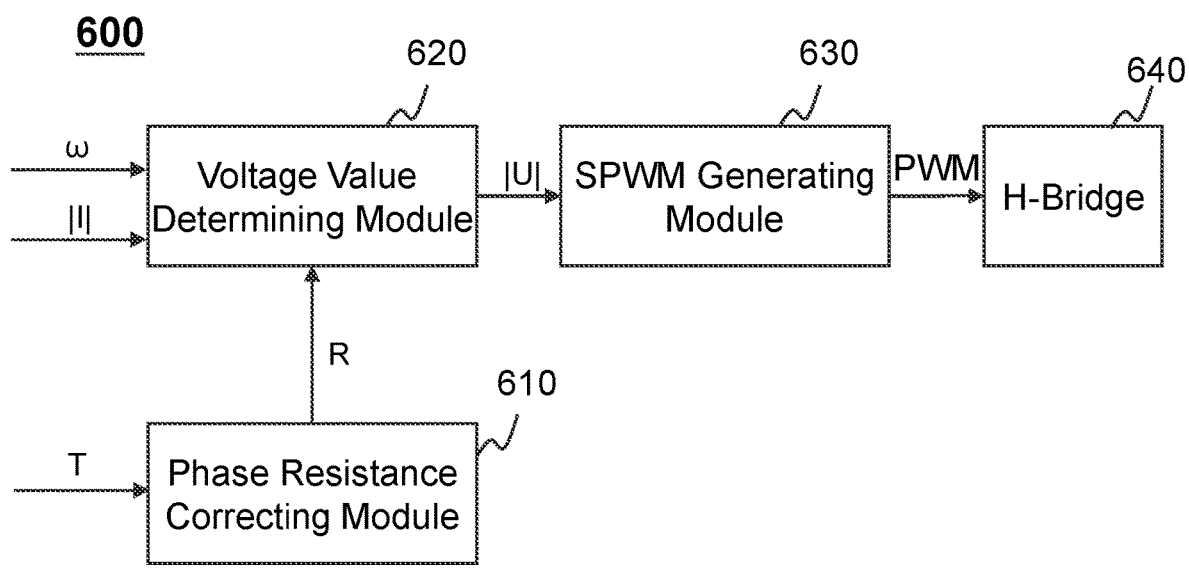
FIG. 6 is a schematic diagram illustrating an exemplary system for controlling a stepping motor according to some embodiments of the present disclosure.

FIG. 6 is a schematic diagram illustrating an exemplary system 600 for controlling a stepping motor according to some embodiments of the present disclosure. As shown in FIG. 6, the system 600 may include a phase resistance correcting module 610, a voltage value determining module 620, an SPWM generating module 630, and an H-bridge 640.

In some embodiments, the phase resistance correcting module 610 may correct the phase resistance of the stepping motor 120 based on an operating environment (e.g., a temperature of the operating environment) of the stepping motor 120. For example, the phase resistance correcting module 610 may correct the phase resistance of the stepping motor 120 according to Equation (10) based on an input temperature T. In some embodiments, the phase resistance correcting module 610 may send the corrected phase resistance R of the stepping motor 120 to the voltage value determining module 620.

In some embodiments, the voltage value determining module 620 may obtain an angle frequency $\omega$, an amplitude $|I|$ of a predetermined electric current I and the corrected phase resistance R to determine an amplitude $|U|$ of a driving voltage U according to Equation (1). In some embodiments, the voltage value determining module 620 may output the amplitude $|U|$ of the driving voltage U to the SPWM generating module 630.

In some embodiments, the SPWM generating module 630 may generate PWM signals based on the amplitude $|U|$. In some embodiments, the SPWM generating module 630 may output the PWM signals to the H-bridge 640. In some embodiments, the H-bridge 640 may drive the stepping motor 120 to work.

Figure 7:
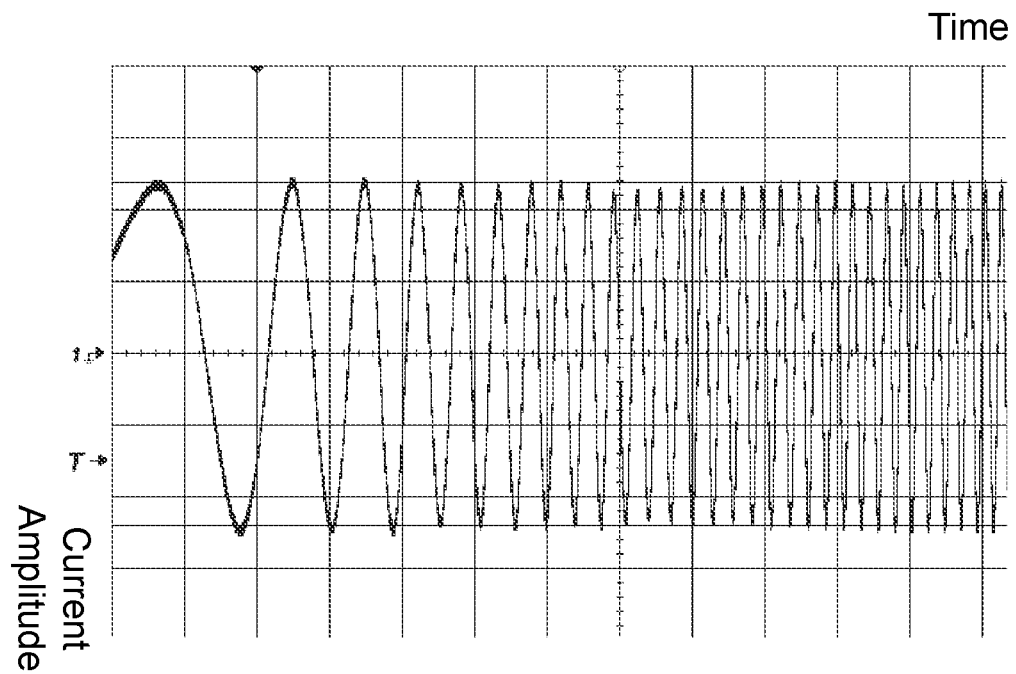
FIG. 7 is a schematic diagram illustrating an exemplary current waveform of a stepping motor according to some embodiments of the present disclosure.
Figure 8:
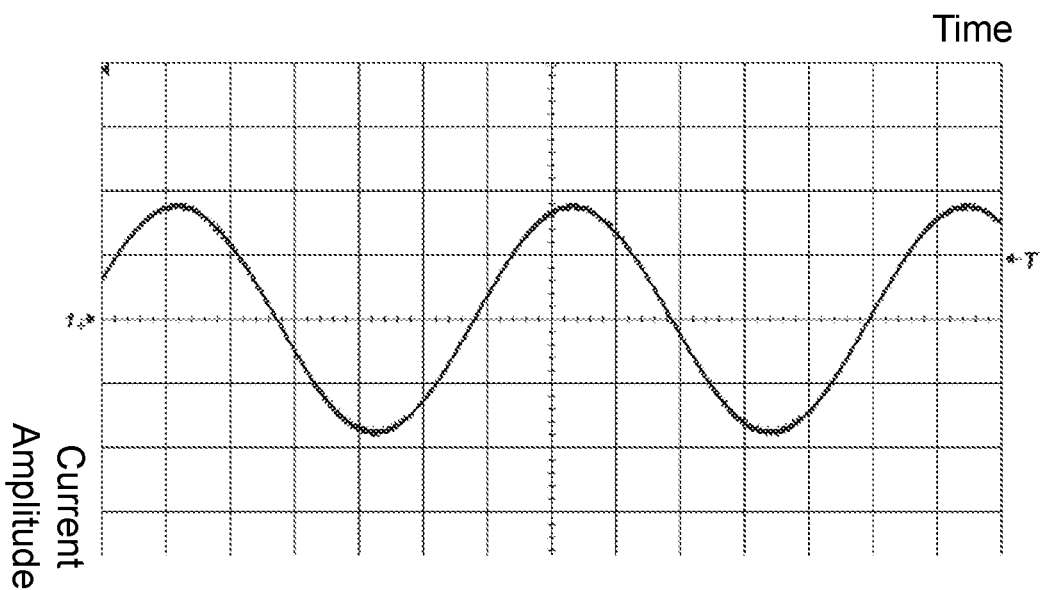
FIG. 8 is a schematic diagram illustrating an exemplary current waveform of a stepping motor according to some embodiments of the present disclosure.

FIG. 7 is a schematic diagram illustrating an exemplary current waveform of a stepping motor 120 according to some embodiments of the present disclosure. In some embodiments, the current waveform of the stepping motor 120 controlled according to the process of the present disclosure may be shown in FIG. 7. FIG. 8 is a schematic diagram illustrating an exemplary current waveform of a stepping motor 120 according to some embodiments of the present disclosure. In some embodiments, FIG. 8 shows a magnification of a piece of the waveform shown in FIG. 7. According to FIG. 7 and FIG. 8, the current amplitude of the stepping motor 120 controlled according to the process of the present disclosure may reach an amplitude of the predetermined electric current. According to the present disclosure, noises may be reduced and problems of vibrations of the stepping motor 120 may be solved.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or orders, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for controlling a stepping motor, comprising:
   at least one storage medium including a set of instructions for controlling a stepping motor; and at least one processor in communication with the storage medium, wherein when executing the set of instructions, the at least one processor is directed to perform operations including:
- determining a driving voltage based on a function, wherein the function includes a predetermined electric current and operating parameters of the stepping motor, and the function includes $|U|= \sqrt{(|I|\omega L+\omega|C|\sin\gamma)^2+(|I|R+\omega|C|\cos\gamma)^2}$, wherein
  - $|U|$ denotes an amplitude of the driving voltage,
  - $|I|$ denotes an amplitude of the predetermined electric current,
  - the predetermined electric current is a sinusoidal current,
  - $\omega$ denotes an angular frequency of the driving voltage,
  - $|C|$ denotes a back electromotive force constant of the stepping motor,
  - L denotes a phase inductance of the stepping motor,
  - $\gamma$ denotes a load angle of the stepping motor, and
  - R denotes a sum of a phase resistance of the stepping motor and an on-resistance of the H-bridge; and
- driving the stepping motor to work based on the driving voltage via an H-bridge.

2. The system of claim 1, wherein the operations further include:
- driving the stepping motor with a first working voltage;
- obtaining a first working current of the stepping motor under the first working voltage; and
- determining the back electromotive force constant based on the first working voltage and the first working current.

3. The system of claim 2, wherein the back electromotive force constant is determined according to $$|C| = \frac{1}{\omega}\sqrt{(|U_1|\sin\phi - |I_1|\cdot\omega L)^2 + (|U_1|\cos\phi - |I_1|\cdot R)^2},$$

wherein
- $|C|$ denotes the back electromotive force constant of the stepping motor,
- $\omega$ denotes an angular frequency of the first working voltage,
- $|U_1|$ denotes an amplitude of the first working voltage,
- $\phi$ denotes a phase of the first working voltage,
- $|I_1|$ denotes an amplitude of the first working current,
- L denotes the phase inductance of the stepping motor, and
- R denotes the sum of the phase resistance of the stepping motor and the on-resistance of the H-bridge.

4. The system of claim 1, wherein the operations further include:
- determining the phase resistance of the stepping motor based on an operating environment of the stepping motor.

5. The system of claim 4, wherein the phase resistance of the stepping motor is determined according to $R_1 = R_{25°\ C.} \times (1+(T-25)*0.004)$, wherein
- $R_1$ denotes the phase resistance of the stepping motor,
- $R_{25°\ C.}$ denotes a phase resistance of the stepping motor when the stepping motor is operated at 25° C., and
- T denotes a temperature of the operating environment.

6. The system of claim 1, wherein the operations further include:
- driving the stepping motor with a second working voltage;
- obtaining a second working current of the stepping motor under the second working voltage; and
- determining the load angle of the stepping motor based on the second working voltage and the second working current.

7. The system of claim 6, wherein the load angle is determined according to $$\gamma = \arctan\frac{|U_2|\sin\phi - |I_2|\cdot\omega L}{|U_2|\cos\phi - |I_2|\cdot R},$$

wherein
- $\gamma$ denotes the load angle,
- $|U_2|$ denotes an amplitude of the second working voltage,
- $\phi$ denotes a phase of the second working voltage,
- $|I_2|$ denotes an amplitude of the second working current,
- $\omega$ denotes an angular frequency of the second working voltage,
- L denotes the phase inductance of the stepping motor, and
- R denotes the sum of the phase resistance of the stepping motor and the on-resistance of the H-bridge.

8. The system of claim 1, wherein the operations further include:
- storing a table indicating a relationship between the driving voltage and the angular frequency.

9. The system of claim 1, wherein the driving the stepping motor to work based on the driving voltage via the H-bridge includes:
- obtaining pulse width modulation (PMW) signals by inputting an amplitude of the driving voltage to a sinusoidal pulse width modulation (SPWM) generation module; and
- controlling the H-bridge to drive the stepping motor by inputting the PWM signals to the H-bridge.

10. A method for controlling a stepping motor, comprising:
- determining a driving voltage based on a function, wherein the function includes a predetermined electric current and operating parameters of the stepping motor, and function includes $|U|= \sqrt{(|I|\omega L+\omega|C|\sin\gamma)^2+(|I|R+\omega|C|\cos\gamma)^2}$, wherein
  - $|U|$ denotes an amplitude of the driving voltage,
  - $|I|$ denotes an amplitude of the predetermined electric current,
  - the predetermined electric current is a sinusoidal current,
  - $\omega$ denotes an angular frequency of the driving voltage,
  - $|C|$ denotes a back electromotive force constant of the stepping motor,
  - L denotes a phase inductance of the stepping motor,
  - $\gamma$ denotes a load angle of the stepping motor, and
  - R denotes a sum of a phase resistance of the stepping motor and an on-resistance of the H-bridge; and
- driving the stepping motor to work based on the driving voltage via an H-bridge.

11. The method of claim 10, further comprising:
- driving the stepping motor with a first working voltage;
- obtaining a first working current of the stepping motor under the first working voltage; and
- determining the back electromotive force constant based on the first working voltage and the first working current.

12. The method of claim 11, wherein the back electromotive force constant is determined according to $$|C| = \frac{1}{\omega}\sqrt{(|U_1|\sin\phi - |I_1|\cdot\omega L)^2 + (|U_1|\cos\phi - |I_1|\cdot R)^2},$$

wherein
- $|C|$ denotes the back electromotive force constant of the stepping motor,
- $\omega$ denotes an angular frequency of the first working voltage,
- $|U_1|$ denotes an amplitude of the first working voltage,
- $\phi$ denotes a phase of the first working voltage,
- $|I_1|$ denotes an amplitude of the first working current,
- L denotes the phase inductance of the stepping motor, and
- R denotes the sum of the phase resistance of the stepping motor and the on-resistance of the H-bridge.

13. The method of claim 10, further comprising:
determining the phase resistance of the stepping motor based on an operating environment of the stepping motor.

14. The method of claim 13, wherein the phase resistance of the stepping motor is determined according to $R_1 = R_{25°\,C.} \times (1+(T-25)*0.004)$, wherein
- $R_1$ denotes the phase resistance of the stepping motor,
- $R_{25°\,C.}$ denotes a phase resistance of the stepping motor when the stepping motor is operated at 25° C., and
- T denotes a temperature of the operating environment.

15. The method of claim 10, further comprising:
driving the stepping motor with a second working voltage;
obtaining a second working current of the stepping motor under the second working voltage; and
determining the load angle of the stepping motor based on the second working voltage and the second working current.

16. The method of claim 10, further comprising:
storing a table indicating a relationship between the driving voltage and the angular frequency.

17. The method of claim 10, wherein the driving the stepping motor to work based on the driving voltage via the H-bridge includes:
obtaining pulse width modulation (PMW) signals by inputting an amplitude of the driving voltage to a sinusoidal pulse width modulation (SPWM) generation module; and
controlling the H-bridge to drive the stepping motor by inputting the PWM signals to the H-bridge.

18. A non-transitory readable medium, comprising at least one set of instructions for controlling a stepping motor, wherein when executed by at least one processor of an electrical device, the at least one set of instructions directs the at least one processor to perform operations including:
determining a driving voltage based on a function, wherein the function includes a predetermined electric current and operating parameters of the stepping motor and the function includes $|U| = \sqrt{(|I|\omega L + \omega|C|\sin\gamma)^2 + (|I|R + \omega|C|\cos\gamma)^2}$, wherein
- $|U|$ denotes an amplitude of the driving voltage,
- $|I|$ denotes an amplitude of the predetermined electric current,
- the predetermined electric current is a sinusoidal current,
- $\omega$ denotes an angular frequency of the driving voltage,
- $|C|$ denotes a back electromotive force constant of the stepping motor,
- L denotes a phase inductance of the stepping motor,
- $\gamma$ denotes a load angle of the stepping motor, and
- R denotes a sum of a phase resistance of the stepping motor and an on-resistance of the H-bridge; and
driving the stepping motor to work based on the driving voltage via an H-bridge.

* * * * *